US008373705B2

(12) United States Patent
Gouesbet et al.

(10) Patent No.: US 8,373,705 B2
(45) Date of Patent: Feb. 12, 2013

(54) METHOD FOR COMPUTING ANIMATION PARAMETERS OF OBJECTS OF A MULTIMEDIA SCENE

(75) Inventors: Pierre-Erwann Gouesbet, Saint-Domineuc (FR); Emmanuel Rohee, Chantepie (FR)

(73) Assignee: Streamezzo, Paris (FR)

( * ) Notice: Subject to any disclaimer, the term of this patent is extended or adjusted under 35 U.S.C. 154(b) by 836 days.

(21) Appl. No.: 12/294,732

(22) PCT Filed: Mar. 27, 2007

(86) PCT No.: PCT/EP2007/052941
§ 371 (c)(1),
(2), (4) Date: May 5, 2009

(87) PCT Pub. No.: WO2007/110432
PCT Pub. Date: Oct. 4, 2007

(65) Prior Publication Data
US 2010/0016026 A1    Jan. 21, 2010

(30) Foreign Application Priority Data
Mar. 28, 2006 (FR) .................................. 06 02704

(51) Int. Cl.
*G06T 13/00* (2006.01)
(52) U.S. Cl. .................. 345/473; 345/474; 345/475
(58) Field of Classification Search ........... 345/473–475
See application file for complete search history.

(56) References Cited

U.S. PATENT DOCUMENTS

| | | | | |
|---|---|---|---|---|
| 6,535,215 B1 * | 3/2003 | DeWitt et al. | ................. | 345/473 |
| 6,584,479 B2 * | 6/2003 | Chang et al. | ................. | 715/205 |
| 7,885,931 B2 * | 2/2011 | Seo et al. | ................. | 707/640 |
| 2004/0075700 A1 * | 4/2004 | Liu et al. | ................. | 345/867 |
| 2004/0225966 A1 * | 11/2004 | Besharat et al. | ................. | 715/705 |
| 2007/0013699 A1 * | 1/2007 | Nelson et al. | ................. | 345/473 |
| 2007/0165031 A1 * | 7/2007 | Gilbert et al. | ................. | 345/473 |
| 2007/0225021 A1 * | 9/2007 | Im et al. | ................. | 455/466 |

OTHER PUBLICATIONS

Office Action from Chinese Patent Application No. 200780011240.X dated Apr. 27, 2011.
English Translation of Anonymous: "World Wide Web Consortium Issues Scalable Vector Graphics (SVG) 1.1 and Mobile SVG as W3C Recommendations, Open Graphics Format Extends Multimedia Beyond the Desktop to Cell phones and Pocket Computers", http://www.w3.org/, Jan. 14, 2003.
"Scalable Vector Graphics (SVG1.1 Specification, Chapter 19)", Internet Citation, Jan. 14, 2003.
Anonymous: "Review GSM phone Nokia 6111", Feb. 17, 2006.
Anonymous: "World Wide Web Consortium gibt Scalable Vector Graphics (SVG) 1.1 und Mobile SVG als W3C Recommendation frei", Jan. 14, 2003.

(Continued)

*Primary Examiner* — Jeffrey Chow
(74) *Attorney, Agent, or Firm* — Zilka-Kotab, PC

(57) ABSTRACT

A method is provided for creating a multimedia scene including at least one object animation, designed to be reproduced on at least one radio communication terminal. At least one of the animations is associated with a non-temporal animation variable, representing a state of at least one object of the scene, of at least one element of the terminal, and/or a state of at least one associated communication network. The variable provides a time-based function for the animation. A method is also provided for reproducing a multimedia scene comprising at least one object animation, on a radio communication terminal.

4 Claims, 4 Drawing Sheets

OTHER PUBLICATIONS

Mosmondor et al.: "LiveMail Personalized Avatars for Mobile Entertainment", The Third International Conference on Mobile Systems, Applications and Services, Dec. 31, 2005.

International Search Report of Counterpart Application No. PCT/EP2007/052941 filed on Mar. 27, 2007.

French Search Report of Foreign Counterpart Application No. 06/02704 filed on Mar. 28, 2006.

Office Action from Chinese Patent Application No. 200780011240.X, dated Mar. 1, 2012.

Written Opinion from International Application No. PCT/EP2007/052941, dated Jun. 6, 2007.

Office Action from Chinese Patent Application No. 200780011240.X, dated Jul. 20, 2012.

* cited by examiner

METHOD FOR COMPUTING ANIMATION PARAMETERS OF OBJECTS OF A MULTIMEDIA SCENE

CROSS-REFERENCE TO RELATED APPLICATIONS

This Application is a Section 371 National Stage Application of International Application No. PCT/EP2007/052941, filed Mar. 27, 2007 and published as WO 2007/110432 on Oct. 4, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of creating and rendering animations inside multimedia scenes, for example of the RichMedia type, on any type of terminal.

More specifically, the disclosure relates to the dynamic and automatic modification of multimedia scene animation parameters, by enabling them to be adapted to external parameters.

Indeed, a multimedia scene, in the sense of this document, consists of objects each representing various characteristics (sizes, colours, animation, content, etc.), according to known techniques, which have been the subject of standards such as, for example, SVG or VRML ("Virtual Reality Modelling Language") and, for at least some of them, various possibilities for animating and/or modifying their behaviour.

Thus, the disclosure applies in particular, but not exclusively, to all RichMedia-type formats capable of defining animation objects and/or animations intended to change over time, for example BIFS ("Binary Format Scene" describing objects as well as their spatial, temporal and interactive behaviours), SMIL ("Synchronized Multimedia Integration Language"), SVG ("Scalable Vector Graphics") or LASeR ("Lightweight Application Scene Representation") formats.

BACKGROUND OF THE DISCLOSURE

Such scenes can be programmed by a developer, so as to enable interactivity with the user of a terminal on which it is played.

However, according to the known prior art techniques, the rendering of multimedia (or simply graphic) scenes is exclusively deterministic in that it is dependent solely on the time that has passed and any interactions between the user and said scenes, usually by means of the interface of the terminal, for example a mobile terminal, on which said scenes are rendered.

The prior art discloses technical solutions intended to modify the temporal reference framework of an element or an object of a scene, such as, for example, the "MediaSensor" object defined in standard MPEG-4, of which the animation behaviour may be made dependent on the flow of media being read.

The prior art also discloses, and more specifically in the SVG standard, the "TimeContainer" object, which makes it possible to define a new time base for animations of a multimedia scene.

However, a disadvantage common to the MediaSensor object of MPEG-4 and the TimeContainer object of SVG is that they enable the running of an object animation to be linked only with the flow of the media rendered on the screen of the terminal, without any other possibility.

In other words, according to the known prior art, the adaptation of the running of multimedia scene animations is based solely on deterministic elements.

SUMMARY

An aspect of the disclosure relates to a method for creating a multimedia scene including at least one animation of an object, intended to be rendered on at least one radio communication terminal.

According to an embodiment of the invention, at least one of said animations is associated with a non-temporal animation variable, representing a state of at least one object of said scene, at least one element of said terminal and/or a state of an associated communication network, in which said variable performs a time base function for said animation.

Thus, the creation method according to an embodiment of the invention makes it possible to take into account various parameters of the current clock of the scene in order to animate said scene later, when it is rendered. Its parameters may, for example, be a state of another object of the scene, or a state of the terminal for rendering the scene or of the associated communication network. This variable will then be considered, when rendering the scene, to be a time base enabling feedback control of the running of the animation.

Advantageously, such a method includes the following steps:
  defining at least one animation parameter of said object, capable of being modified over time;
  associating said animation parameter with said non-temporal animation variable;
  parameterizing at least one modification of said animation parameter, so that the rendering of said object is modified on the basis of a change in said animation variable.

Thus, the method for creating the scene associates an object with an animation parameter, which itself will be associated with the non-temporal animation variable described above.

Preferably, said non-temporal animation variable represents one of the variables belonging to the group including:
  the loading or transmission of a file;
  the rendering of an audio and/or video sequence;
  the space available in a memory;
  the charge level of a battery;
  the charge time of a battery;
  the sound volume for rendering sounds;
  the percentage of use of at least one microprocessor;
  the level of reception quality 3G/GSM;
  a fraction forming an interpolation factor.

In particular, said fraction is contained in an event associated with said animation or received by said animation.

Advantageously, said parameterisation step includes a step of computing said fraction, corresponding to a ratio between at least one first parameter T representing a predefined time, representing a time that has passed, and a second parameter D representing a predefined time, representing a total duration of the animation, in which said parameters are provided by said non-temporal animation variable.

In addition, said computing step includes a step of determining the source for obtaining said parameters, on the basis of an attribute of said animation.

Thus, the method for creating the scene makes it possible to define a new, non-temporal animation reference framework, on the basis of parameters capable of being considered times or durations.

In particular, said element of said terminal is of the type belonging to the group including:
- a hardware element;
- an electromagnetic element;
- a chemical element;
- a software element.

An embodiment of the invention also relates to an animation signal of at least one multimedia object of a multimedia scene, intended to be rendered on at least one radio communication terminal.

According to an embodiment of the invention, such a signal has at least one animation parameter of said object, capable of being modified over time, with which a non-temporal animation variable is associated, representing a state of at least one object of said scene, at least one element of said terminal and/or a state of an associated communication network, in which said variable performs a time base function for the animation of said object.

Another aspect of an embodiment of the invention relates to a method for rendering a multimedia scene including at least one animation of an object on a radio communication terminal.

Such a method includes the following steps:
- implementing at least one object of said scene, including at least one animation parameter of said object, capable of being modified over time, with which a non-temporal animation variable is associated, representing a state of at least one object of said scene, at least one element of said terminal and/or a state of an associated communication network;
- determining a value of said animation variable;
- modifying said animation parameter, on the basis of the value of said animation variable, so that the rendering of said object is modified according to a change in said animation variable.

An embodiment of the invention also relates to a computer program product that can be downloaded from a communication network and/or recorded on a computer-readable medium and/or capable of being run by a processor including program code instructions for implementing the method for rendering a multimedia scene including at least one animated object as described above.

Finally, an embodiment of the invention relates to a mobile radio communication terminal including at least means for rendering at least one multimedia scene including at least one object animation, characterised in that it includes the following means:
- means for implementing at least one object of said scene, including at least one animation parameter of said object, capable of being modified over time, with which a non-temporal animation variable is associated, representing a state of at least one object of said scene, at least one element of said terminal and/or a state of an associated communication network;
- means for determining a value of said animation variable;
- means for modifying said animation parameter, on the basis of the value of said animation variable, so that the rendering of said object is modified according to a change in said animation variable.

These objectives, as well as other that will become clearer below, are achieved by a method for animating at least one multimedia object of a multimedia scene, in which at least one animation parameter of said multimedia objects is modified over time, when said scene is played on a mobile radio communication terminal, on the basis of a predetermined timeline.

According to such a method, said timeline advantageously defines a series of at least one modification time of at least one of said animation parameters, and a time definition type, including at least:
- a first definition type according to a time base, called a time definition, associating, with each modification time, a temporal value defined by a clock;
- a second definition type according to a state base, called a deterministic definition, associating, with each time, at least one non-temporal data item representing at least one parameter of at least one object of said scene and/or at least one event associated with at least one object of said scene, and/or at least one state of a hardware element of said terminal.

Thus, the method according to an embodiment of the invention consists of modifying the running of animations of a graphic or multimedia scene according to certain variable change parameters of an object and/or an event associated with, or targeting, said object in a graphic scene.

As an illustrative and non-limiting example, when, in a multimedia scene, "progressEvent"-type events are attached to objects of a multimedia scene in order to promote the change of the latter, a fraction contained in the running of such events can then be received directly by the receiving terminal playing the multimedia scene.

Thus, when an animation of the multimedia scene is played on the terminal, the animation uses the fraction received as an interpolation factor.

Moreover, the multimedia scenes of the RichMedia type, for example, define a plurality of animations of which the behaviour is associated with the change in the scene over time. Indeed, in each step of rendering an animation on the terminal, the latter performs a set of computations to determine the reference point or the key corresponding to the current time considered.

The animation method according to an embodiment of the invention thus makes it possible to overload the computation of the time passage for each animation of a graphic or multimedia scene.

Each animation of a multimedia scene will therefore no longer necessarily refer to the current clock of the scene, but may nevertheless refer to any other data source or to any other non-deterministic but measurable elements enabling a new animation reference framework, not necessarily temporal, to be defined.

In a first advantageous embodiment of the invention, said timeline includes a definition type indicator, using said first type by default.

In a preferred embodiment of the invention, said non-temporal data represents the change of an operation or a state of at least one element of said terminal.

Thus, the method according to an embodiment of the invention advantageously makes it possible to enrich the possibilities of multimedia scene content scenarios, for example, but not exclusively, RichMedia-type scenes intended to be rendered on mobile radio communication terminals including functionalities for displaying and rendering such scenes, enabling them to be dynamically and automatically adapted to parameters outside a scene.

Preferably, said element of said terminal is of the type belonging to the group including:
- a hardware element;
- an electromagnetic element;
- a chemical element;
- a software element.

Thus, advantageously, the animation method according to an embodiment of the invention enables, for example, a multimedia or graphic scene author to:
- animate graphic or multimedia objects on the basis of the flow of a video and/or the filling state of buffer memories associated with the video reader;
- animate graphic or multimedia objects according to the state of the terminal rendering the multimedia or graphic scene: battery charge level, level of quality of the network reception by the terminal, etc.;
- animate graphic or multimedia objects according to the state of the software enabling the scene to be rendered on a terminal: memory space still available, amount of network data loaded by a mobile radio communication terminal, etc.;
- animate logic sate objects according to the properties of the rendering platform, for example a mobile radio communication terminal, so as to be capable of defining a parameterisation of access to certain content according to the language used by the terminal, or a display parameterisation (colour selection, resizing of screen size in order to render a multimedia scene, etc.).

Thus, an embodiment of the invention advantageously makes it possible to animate graphic and/or multimedia elements, independently of one another, according to one or more measurements performed on the terminal or on any other software and/or hardware element equipping and/or being electrically connected and/or by a wire and/or wireless communication connection with said terminal on which a multimedia scene is rendered.

Advantageously, said operation or said state belongs to the group including:
- the loading or the transmission of a file;
- the rendering of an audio and/or video sequence;
- the space available in a memory;
- the charge level of a battery;
- the charge time of a battery;
- the sound volume for rendering sounds;
- the percentage of use of at least one microprocessor;
- the level of reception quality 3G/GSM;
- a fraction forming an interpolation factor;
- an event associated with an object of said scene and containing a fraction forming an interpolation factor of the animation of said object.

Thus, when a file describing a multimedia scene, for example in RichMedia format, defines an animation or an object capable of being animated in the scene, it is nevertheless possible by means of the animation method according to an embodiment of the invention to individually assign the behaviour of the animation or the animated object. It is simply necessary to indicate in the scene description file, with respect to the animation or the animated object considered, which operation or which state mentioned above should be taken into account in order to define/compute the temporal and/or interpolation reference framework of the animation, independently of the method for computing the latter.

In a preferred embodiment of the invention, said timeline takes into account a ratio between at least one first parameter T, which can represent a predefined time, and at least one second parameter D, which can represent a predefined duration.

For example, the multimedia scenes taking the form of content in RichMedia format intended to be rendered on a mobile terminal, contain the animation definition capable of assigning the logic or graphic properties of the elements/objects constituting said scene.

An animation modifies the target properties (animation parameters) in a discrete and interpolated manner, according to a predefined temporal plan.

This temporal plan defines the start date or event of the animation. It defines a series of time intervals each associated with a property of the target.

On each rendering of the RichMedia scene, the animation is based on the current time of the scene, noted Tc, on its start date Td and on its total duration A in order to compute the interpolation factor F and thus be capable of positioning, in the target, the corresponding property of this factor, with F then being written: $F=(Tc-Td)/A$.

With the animation method according to an embodiment the invention, it is then necessary simply to indicate, at an animation or at an object capable of being animated, which parameter source representing a time base to take into account, on the condition that said source be capable of providing at least one parameter noted T representing a time and at least one parameter noted D representing a duration. The source can also directly provide a fraction between 0 and 1 or a percentage, which corresponds to providing the interpolation factor directly.

When the parameters T and D are provided by the source, for example an operation or a state mentioned above, the interpolation factor of the animation at the time of the rendering measurement of the latter will take the form $F=T/D$, which causes the modification of the time reference framework, with respect to that of the origin of the multimedia scene containing the animation.

Thus, the animation method according to an embodiment of the invention includes a step of rendering said multimedia scene on said mobile radio communication terminal, including a step of computing a factor F of interpolating said animation, taking into account said timeline and/or said ratio.

As an illustrative and non-limiting example, to apply the animation method according to an embodiment of the invention, it is necessary to define, for the RichMedia format, a set of "customised" animation attributes for animations or objects capable of being animated.

Below is a possible example of such attributes for the implementation of the method according to an embodiment of the invention.

If a RichMedia-type animation format defines an animation with the form:

```
<animation target=TARGET attribute=ATTRIBUTE id=ID
repeat=REPEAT start=START end=END compute=COMPUTE>
<animation key frame="0%" value= ATTRIBUTE0>
<animation key frame="20%" value= ATTRIBUTE20>
<animation key frame="70%" value= ATTRIBUTE70>
<animation key frame="100%" value= ATTRIBUTE 100>
</animation>
```

The author of the multimedia or graphic scene in RichMedia format can then individually assign the behaviour of the animation by indicating the new source to be taken into account in order to compute interpolation parameters, independently of the method of computing the latter, as follows:

```
<update target =id>
    <Attribute attribute=timeline provider= PROVIDERFNC/>
</update>
``` where:

PROVIDERFCN is the address of a provider of parameters (for example, of the terminal or a component connected to said terminal, electrically and/or by a wire or wireless communication connection) enabling the interpolation computation, for example:

device::batterylevel( ) to take into account the instantaneous charge level of the battery of the terminal on which a multimedia scene is being rendered;

media::bufferlevel( ) to take into account the state (occupied space) of the buffer memory for reading media (for example a video displayed on the terminal);

device::screenwidth( ) to take into account the screen width;

RM::memoryleft( ) to take into account the terminal memory space still free.

Thus, an embodiment of the invention enables the author of a multimedia scene to design a simple scenario in which it is possible to take into account, as a reference for the running of animations contained in said scene, elements as diverse as the running time of a video, the charge state of the battery of the terminal or mobile telephone on which the scene is to be rendered, the current sound volume of the terminal or the mobile telephone, the memory space available for the software, or the size of the display screen of the terminal on which the scene will be rendered, without needing to consider, in advance, the possible type of terminals on which the multimedia or graphic scenes may be rendered.

An embodiment of the invention also relates to a computer program product including code instructions for executing the steps of the method for animation of at least one multimedia object of a multimedia scene, in which at least one animation parameter of said multimedia object(s) is modified over time, when said scene is played on a mobile radio communication terminal, on the basis of a predetermined timeline, as mentioned above, when they are run on a computer.

An embodiment of the invention also relates to an animation signal of at least one multimedia object of a multimedia scene, advantageously with at least one animation parameter of said multimedia object(s) intended to be modified over time, when said scene is played on a mobile radio communication terminal, in which said at least one parameter takes into account a predetermined timeline, and said timeline is defined by a series of at least one modification time of at least one of said animation parameter(s), and by a time definition type, including at least:

a first definition type according to a time base, called a time definition, associating, with each modification time, a temporal value defined by a clock;

a second definition type according to a state base, called a deterministic definition, associating, with each time, at least one non-temporal data item representing at least one parameter of at least one object of said scene and/or at least one event associated with at least one object of said scene, and/or at least one state of a hardware element of said terminal.

An embodiment of the invention also relates to a mobile multimedia radio communication terminal that includes at least one interface for rendering multimedia scenes respectively composed of at least one multimedia object capable of being animated according to at least one parameter that can be modified over time on the basis of a predetermined timeline, when one of said scenes is played on said terminal, in which said timeline defines a series of at least one modification time of at least one of said animation parameters, and a time definition type, including at least:

a first definition type according to a time base, called a time definition, associating, with each modification time, a temporal value defined by a clock;

a second definition type according to a state base, called a deterministic definition, associating, with each time, at least one non-temporal data item representing at least one parameter of at least one object of said scene and/or at least one event associated with at least one object of said scene, and/or at least one state of a hardware element of said terminal.

BRIEF DESCRIPTION OF THE DRAWINGS

Other features and advantages of the invention will become clearer on reading the following description of a preferred embodiment of the invention, given by way of a simple illustrative and non-limiting example, and appended drawings, in which.

DETAILED DESCRIPTION OF ILLUSTRATIVE EMBODIMENTS

Figure 5:
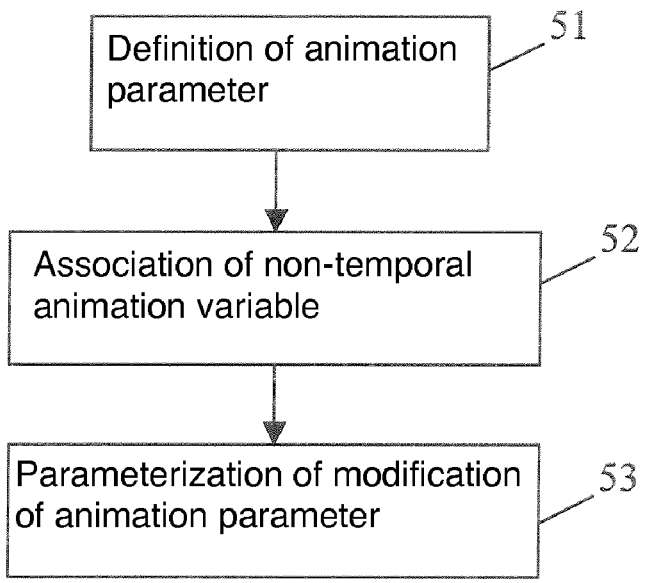
FIGS. 5 and 6 respectively show the main steps of the creation method and the rendering method according to a specific embodiment of the invention.

Below, with respect to FIG. 5, the main steps of the method for creating a multimedia scene according to an embodiment of the invention is shown.

The first step 51 of defining an animation parameter consists of defining at least one animation parameter of an object of the multimedia scene, which parameter is capable of being modified over time.

The modification of this parameter to be modified is dependent on a pre-defined non-temporal animation variable, which is associated, in the association step 52, with the animation parameter considered.

Then, step 53 of parameterising the modification of the animation parameter makes it possible to define the basis of the animation of the object, i.e. which changes to the non-temporal animation variable enable the object to be animated, via the animation parameter defined in step 51.

Figure 6:
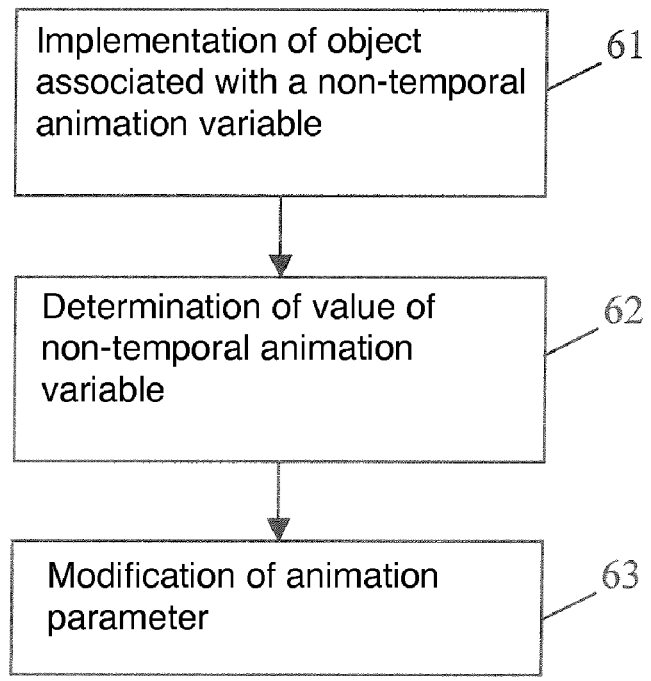

When the multimedia scene created earlier according to the main steps of the creation method described above is rendered, the following steps, shown in FIG. 6, are implemented:

a step 61 of implementing an object, including at least one animation parameter, with which, in step 52 described above, a non-temporal animation variable has been associated;

a step 62 of determining a value of said non-temporal animation variable, for example a measurement of a state of an object of the scene, or an element of the terminal or of the communication network associated with the rendering of the scene;

a step 63 of modifying the animation parameter, so as to animate the object on the basis of the value, determined in the previous step, of the variable.

Figure 1:
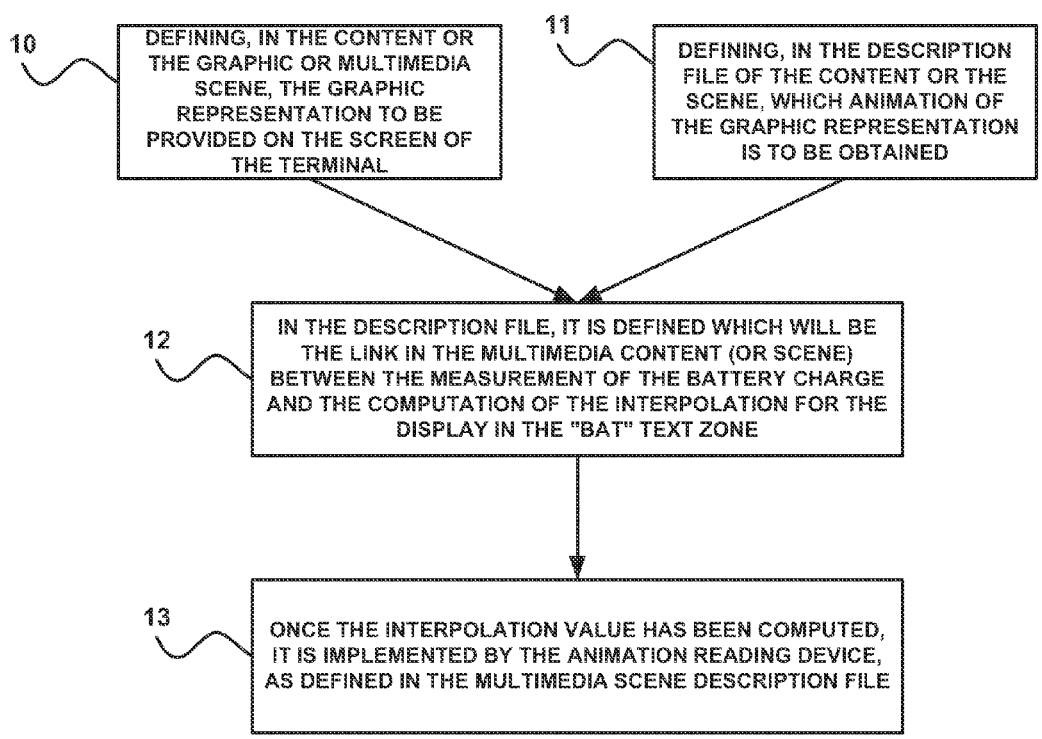
FIG. 1 shows the organisation chart of the major steps of the animation method according to an embodiment of the invention.
Figure 2:
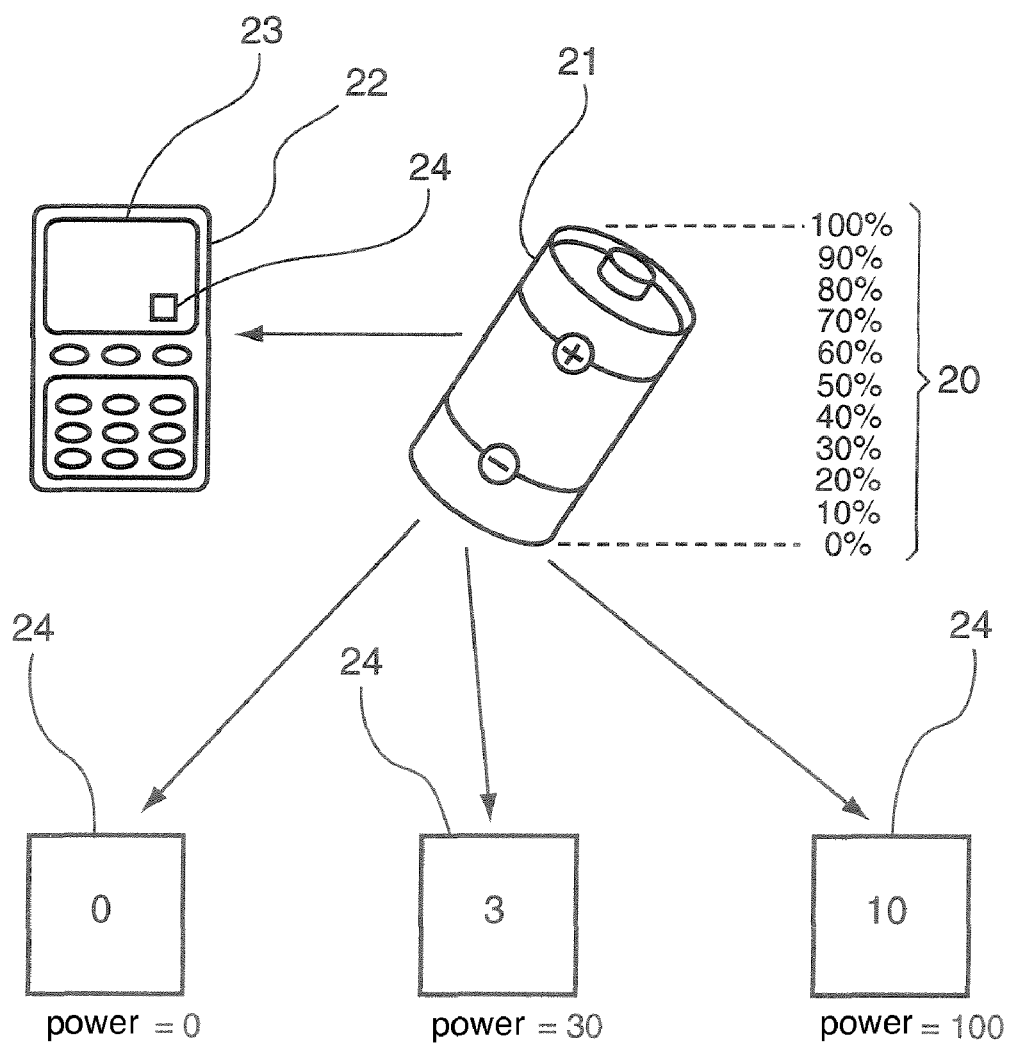
FIG. 2 shows an example of an overload of animation computation parameters, on the basis of the charge level of the battery of a mobile terminal.

A detailed embodiment of the animation method according to an embodiment of the invention is described in detail with respect to FIGS. 1 and 2.

As shown in FIG. 2, it is sought to display in a zone 24 of the screen 23 of a mobile terminal 22, no longer a charge percentage 20 of the battery 21, but a text from "0" to "10" representing said power.

A first step 10 involves defining, in the content or the graphic or multimedia scene, for example in RichMedia format, the graphic representation to be provided on the screen of the terminal 22.

This is done directly inside the description file, as follows:
<text string="" def="bat" position=pos/>
where:
text string is the definition of the text display object;
def="bat" defines the name of the text display zone;
position=pos defines the position of the text zone on the screen.

A second step 11 involves defining, in the description file of the content or the scene in RichMedia format, which animation of the graphic representation is to be obtained.

In this example, this definition can have the following form:

```
<animation target="bat" def="batanim "attribute= string start=0 compute=discrete duration=100>
    <animationkey frame="0%" value= "0">
    <animationkey frame="10%" value= "1">
    <animationkey frame="20%" value= "2">
    <animationkey frame="30%" value= "3">
    <animationkey frame="40%" value= "4">
    <animationkey frame="50%" value= "5">
    <animationkey frame="60%" value= "6">
    <animationkey frame="70%" value= "7">
    <animationkey frame="80%" value= "8">
    <animationkey frame="90%" value= "9">
    <animationkey frame="100%" value= "10">
</animation>
``` in which the parameters of the animation are as follows:
target="bat": defines the target as the "bat" text display zone;
def="batanim" attribute=string start=0 compute=discrete duration=100: defines an animation named "batanim", with a character string-type attribute, reset to a display start value "0", of execution based on a discrete parameter.

Then, in a third step 12, in the description file, it is defined which will be the link in the multimedia content (or scene) between the measurement of the battery charge and the computation of the interpolation for the display in the "bat" text zone defined above. This is done as follows:

```
<update target="batanim">
    <attribute attribute="timeline" value="device::battery"/>
</update>
``` where:
target="batanim": defines the target of the animation according to the previously determined interpolation value;
attribute="timeline" value="device::battery: defines the timeline attribute (interpolation value), which in this case is determined on the basis of the charge value 20 of the battery 21 of the mobile terminal.

Once the interpolation value has been computed, it is implemented in a final step 13 by the animation reading device, as defined in the multimedia scene description file.

When this implementation step is performed, the standard reading of the RichMedia content is then initiated, and the animation computes a value interpolated on the basis of its "timeline" attribute, which is "device::battery".

The animation is then capable of asking the reading device (the mobile terminal 22) to solve the measurement function "device::battery", so that the implantation of the reader uses, on this word, the local function of the hardware in order to perform the measurement, according to the following animation pseudo code:

```
if ("time"!= timeline)
    paramsAnimCourant = lecteur_Mesure(timeline); (first timeline
time definition type according to an embodiment of the invention)
    ...
```

Below, the corresponding reader pseudo code for the second timeline time definition type according to the invention is presented:

```
lecteur_Mesure(timeline);
if("device::battery"==timeline)
    return (SpecDevice_MeasureBatteryLevel( ),
            SpecDevice_MAXBatteryLevel( ))
    ...
```

The local system is activated in order to measure the current value of the power and the maximum value.

The animation computes its current interpolation key with these parameters; the display of the interpolated text (from "0" to "10") is displayed on the screen 23, in zone 24.

Figure 3:
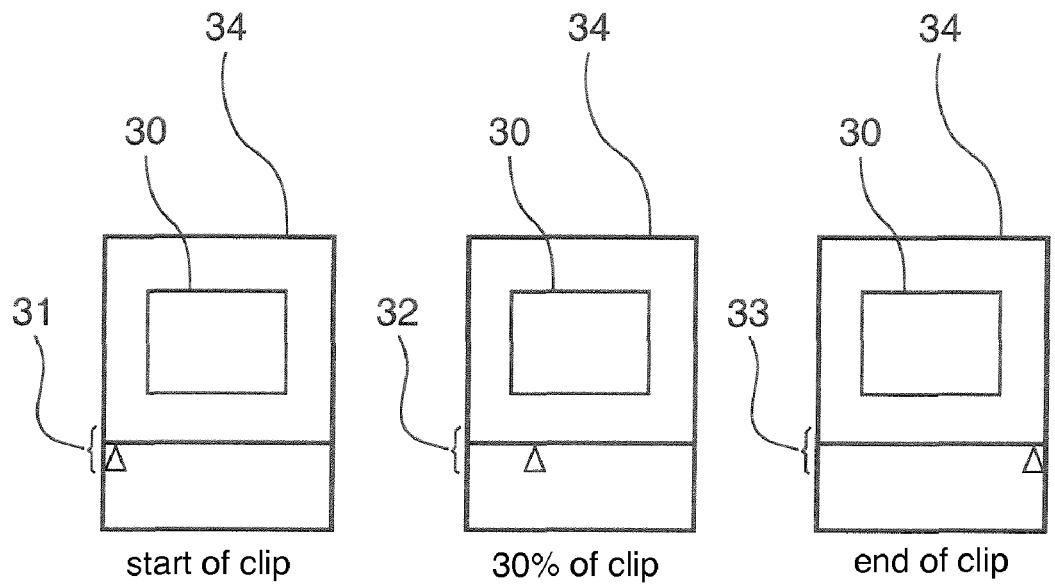
FIG. 3 shows a second example of an implementation of the method according to an embodiment of the invention in which the flow of a video being read by means of a mobile cursor is shown.
Figure 4:
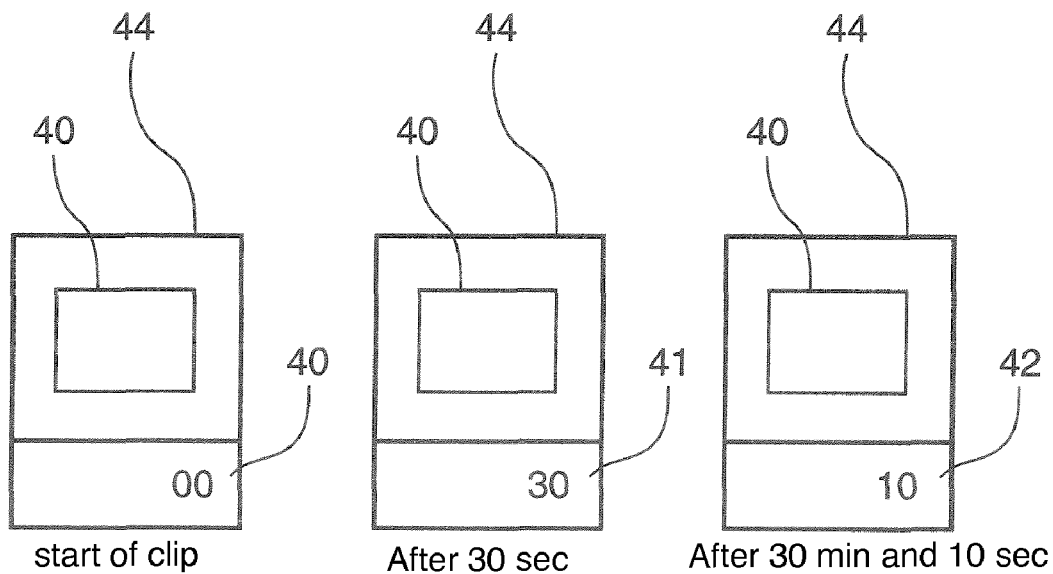
FIG. 4 shows an alternative of the example of FIG. 3, in which the display of the current time of a video is shown.

A second example of an implementation of the method according to an embodiment of the invention will now be presented with respect to FIGS. 1, 3 and 4, in which the flow of a video 30 being read by means of a mobile cursor (31, 32, 33) is shown.

In a first step 10, in the file describing the contents or the graphic scene or the multimedia, for example in RichMedia format, the graphic representation to be obtained on the screen of the terminal 34 is defined.

This is done directly inside the description file, as follows:

```
<shape shape=...def="vidc" position=0/>
<video url=...def="vid1" />
```

In a second step 11, in this same description file, the animation associated with the graphic representation is defined:

```
<animation target="vidc" def="vidanim" attribute= pos start=0
compute=linear duration=100>
    <animationkey frame="0%" value="0">
    <animationkey frame="100%" value="200">
</animation>
```

In a third step 12, in the contents of the link between the measurement of the video 30 and the computation of the interpolation, the following is then defined:

```
<update target="vidanim">
    <attribute   attribute="timeline"   value=
"videotime::vid1"/>
</update>
```

Once the interpolation value has been computed, it is implemented in a final step 13, by the animation reading device, as it was defined in the multimedia scene description file. This implementation consists in:
  the standard reading of the RichMedia content;
  when the animation computes an interpolated value, its timeline attribute is "videotime::vid1";
  the animation asks the reading device of the mobile terminal to solve the measurement function "videotime::vid1".
In this example, the animation pseudo code is:

```
if("time"!=timeline)
    paramAnimCourant = lecteur_Mesure(timeline); (first timeline
time definition type according to an embodiment of the invention)
    ...
```

Below, the corresponding reader pseudo code for the second timeline time definition type according to an embodiment of the invention is presented:

```
lecteur_Mesure(timeline);
if("videotime::"==timeline.start( ))
return (Media_getVideoTime(timeline.after("::")),
Media_getVideoDuration(timeline.after("::")));...
```

The media manager then returns the current time 40 of the video clip 40 and the duration if it is available.

The animation computes its current interpolation key with these parameters. If the duration is absent, it is considered to be infinite (the cursor 31, 32, 33 loops).

In the example of FIG. 4, the flow of a video is shown by a textual representation of the current time (limited in this example to second and ten seconds).

This is done as follows:
Step 10
Definition in the RichMedia content of the graphic representation:

```
<text string="" def="vsecondes" position=pos/>
<text string="" def="vdixsecondes" position=pos/>
```

Step 11
Definition in the RichMedia content of the animation of the graphic representation:

```
<animation target="vsec" def="vsecondes" attribute=string start=0
repeat=true compute=discrete duration="10s">
    <animationkey frame="0%" value="0">
    <animationkey frame="10%" value="1">
    <animationkey frame="20%" value="2">
    <animationkey frame="30%" value="3">
    <animationkey frame="40%" value="4">
    <animationkey frame="50%" value="5">
    <animationkey frame="60%" value="6">
    <animationkey frame="70%" value="7">
    <animationkey frame="80%" value="8">
    <animationkey frame="90%" value="9">
    <animationkey frame="100%" value="0">
</animation>
<animation target="vdixsec" def="vdixsecondes" attribute=string
start=0 repeat=true compute=discrete duration="60s">
    <animationkey frame="0%" value="0">
    <animationkey frame="10%" value="1">
    <animationkey frame="20%" value="2">
    <animationkey frame="30%" value="3">
    <animationkey frame="40%" value="4">
    <animationkey frame="50%" value="5">
    <animationkey frame="60%" value="6">
    <animationkey frame="70%" value="7">
    <animationkey frame="80%" value="8">
    <animationkey frame="90%" value="9">
    <animationkey frame="100%" value="0">
</animation>
```

Step 12
Definition in the contents of the link between the measurement of the video and the computation of the interpolation

```
<update target="vsec">
    <attribute   attribute="timeline"   value=
"videotimeabs::vid1"/>
</update>
<update target="vdixsec">
    <attribute   attribute="timeline"   value=
"videotimeabs::vid1"/>
</update>
```

Step 13
Implementation by the reading device:
  standard reading of the RichMedia content. When the animation computes an interpolated value, its "timeline" attribute is "videotimeabs::vid1";
  the animation asks the reading device to solve the measurement function "videotimeabs::vid1".
The animation pseudo code is then written:

```
if("time"!=timeline)
    paramAnimCourant = lecteur_Mesure(timeline);
    ...
``` and the corresponding reader pseudo code is written:

```
lecteur_Mesure(timeline);
if("videotimeabs::"==timeline.start( ))
return
Media_getVideoTime(timeline.after("::")), 1000);
    ...
```

The media manager returns the current time of the video clip and the value 1000 (the internal time reference is, for example, the millisecond).

The animation computes its current interpolation key with these parameters.

The animation loops according to its specifications ("repeat"), i.e. a modulo 100 is performed. This makes it possible to have an infinite counter that is not dependent on the possible duration of the video.

It is noted that the animations defined in the scene of this example (FIG. 4) manage only seconds and tens of seconds. It is of course possible to define and display minutes, tens of minutes, and so on. It is only dependent on the duration of the animation defined by means of the "duration" parameter.

An embodiment of the invention provides a technique for adapting the rendering of a multimedia scene on a terminal, in particular but not exclusively on a mobile terminal, to non-deterministic components, which the author of the scene may take into account when creating the latter.

An embodiment of the invention provides such a technique that enables different time bases to be assigned to different animated objects and/or different animations of a multimedia scene without requiring the implantation of an environment with multiple TimeContainers, which are much more complicated to manage than a single TimeContainer.

An embodiment of the invention therefore consists of proposing a technique for dynamic and automatic modification of multimedia scene animation parameters, thus enabling the authors of such scenes to use new behavioural functionalities.

An embodiment of the invention provides such a technique that is inexpensive and simple for the authors and/or the creators of multimedia scenes to implement.

Although the present disclosure has been described with reference to one or more examples, workers skilled in the art will recognize that changes may be made in form and detail without departing from the scope of the disclosure and/or the appended claims.

The invention claimed is:

1. A method, comprising:
    defining an object of a multimedia scene including an animation of the object to be rendered on a radio communication terminal by:
        defining at least one animation parameter of said object, and
        defining an animation variable associated with said at least one animation parameter of said object;
    determining a value of said animation variable, said value including a non-temporal fraction;
    determining a value for said animation parameter based on said determined value of said animation variable, where the value for said animation parameter is determined based on an interpolation factor corresponding to said fraction, where said interpolation factor represents a ratio between a predefined amount of time that has passed within the animation and a predefined total duration of the animation; and
    rendering said object with said animation parameter value;
    wherein said animation of said object is modified over time by modifying over time said animation parameter value in accordance with a periodically determined change in the value of said animation variable.

2. A computer program product recorded on a non-transitory computer-readable medium and including program code instructions for implementing a method of rendering a multimedia scene including at least one animation of an object on a radio communication terminal, when the program is run by a processor, wherein the method includes:
    defining an object of a multimedia scene including an animation of the object to be rendered on a radio communication terminal by:
        defining at least one animation parameter of said object, and
        defining an animation variable associated with said at least one animation parameter of said object;
    determining a value of said animation variable, said value including a non-temporal fraction;
    determining a value for said animation parameter based on said determined value of said animation variable, where the value for said animation parameter is determined based on an interpolation factor corresponding to said fraction, where said interpolation factor represents a ratio between a predefined amount of time that has passed within the animation and a predefined total duration of the animation; and
    rendering said object with said animation parameter value;
    wherein said animation of said object is modified over time by modifying over time said animation parameter value in accordance with a periodically determined change in the value of said animation variable.

3. A mobile radio communication terminal including:
    a processor for:
        rendering at least one multimedia scene including at least one animation of at least one object;
    defining an object of said multimedia scene by:
        defining at least one animation parameter of said object, and
        defining an animation variable associated with said at least one animation parameter of said object;
    determining a value of said animation variable, said value including a non-temporal fraction;
    determining a value for said animation parameter based on said determined value of said animation variable, where the value for said animation parameter is determined based on an interpolation factor corresponding to said fraction, where said interpolation factor represents a ratio between a predefined amount of time that has passed within the animation and a predefined total duration of the animation; and
    rendering said object with said animation parameter value;
    wherein said animation of said object is modified over time by modifying over time said animation parameter value in accordance with a periodically determined change in the value of said animation variable.

4. The method according to claim 1, wherein the animation variable represents a state of an associated communication network.

* * * * *